United States Patent
Kasai et al.

(10) Patent No.: US 7,019,715 B1
(45) Date of Patent: Mar. 28, 2006

(54) HEAD-MOUNTED IMAGE DISPLAY APPARATUS

(75) Inventors: Ichiro Kasai, Kawachinagano (JP); Yasushi Tanijiri, Osakasayama (JP); Hideki Nagata, Kobe (JP)

(73) Assignee: Minolta Co., Ltd., Osaka (JP)

( * ) Notice: Subject to any disclaimer, the term of this patent is extended or adjusted under 35 U.S.C. 154(b) by 554 days.

(21) Appl. No.: 09/615,233

(22) Filed: Jul. 13, 2000

(30) Foreign Application Priority Data

Jul. 14, 1999 (JP) .................................. 11-199790

(51) Int. Cl.
  *G09G 5/00* (2006.01)
  *G02F 1/1335* (2006.01)

(52) U.S. Cl. .............................. 345/8; 349/11; 359/630

(58) Field of Classification Search .................... 345/7, 345/8, 87; 348/42, 51, 52, 54, 59, 53; 359/13, 359/630, 631, 477, 632; 340/461; 349/11
See application file for complete search history.

(56) References Cited

U.S. PATENT DOCUMENTS

| | | | | |
|---|---|---|---|---|
| 4,398,799 A | | 8/1983 | Swift | .......................... 350/174 |
| 4,859,030 A | * | 8/1989 | Rotier | .......................... 359/630 |
| 5,537,092 A | * | 7/1996 | Suzuki et al. | ................ 340/461 |
| 5,537,253 A | | 7/1996 | Cox et al. | .................... 359/630 |
| 5,601,352 A | * | 2/1997 | Okamura | .................... 359/630 |
| 5,646,785 A | * | 7/1997 | Gilboa et al. | ................ 359/632 |
| 5,708,529 A | * | 1/1998 | Togino et al. | .................. 345/8 |
| 5,712,649 A | * | 1/1998 | Tosaki | ........................... 345/8 |
| 5,933,279 A | * | 8/1999 | Yamazaki | .................... 359/630 |
| 5,986,813 A | * | 11/1999 | Saikawa et al. | ............ 359/630 |
| 6,011,653 A | * | 1/2000 | Karasawa | .................... 359/630 |
| 6,150,998 A | * | 11/2000 | Travers et al. | ................. 345/8 |
| 6,185,045 B1 | * | 2/2001 | Hanano | ....................... 359/631 |

\* cited by examiner

*Primary Examiner*—Bipin Shalwala
*Assistant Examiner*—David L. Lewis
(74) *Attorney, Agent, or Firm*—Sidley Austin LLP

(57) ABSTRACT

A head-mounted image display apparatus is provided with: an image display element; a projection optical system that projects an image displayed by the image display element, so as to be enlarged; a reflective screen onto which the image is projected by the projection optical system; and a combiner disposed between the projection optical system and the screen. The combiner transmits the image light from the projection optical system and directs it to the screen, and reflects the image light reflected at the screen and directs it to the user's pupil.

9 Claims, 7 Drawing Sheets

HEAD-MOUNTED IMAGE DISPLAY APPARATUS

This application is based on application No. H11-199790 filed in Japan on Jul. 14, 1999, the entire contents of which are hereby incorporated by reference.

BACKGROUND OF THE INVENTION

1. Field of the Invention

The present invention relates to a head-mounted image display apparatus.

2. Description of the Prior Art

Conventional methods of obtaining high realism in an image display apparatus that directs image light based on a displayed image to the user's pupil include a method in which a displayed image is projected onto the user's pupil as a virtual image without an intermediate image being formed and a method in which a displayed image is projected onto a screen and the user views the image. These methods are advantageous in that a wide viewing angle and a large pupil diameter are comparatively easily obtained and high realism is obtained.

However, in the method in which a virtual image is projected onto the user's eye without an intermediate image being formed, a multiplicity of large-diameter lens elements are necessary to achieve a wide viewing angle and a large pupil diameter, which increases the cost of the optical system and the weight. On the other hand, the method in which an image is projected onto a screen and the user views the image is advantageous in that a large pupil diameter can be achieved by diffusion by the screen and that the projection optical system can be made compact. FIG. 7 schematically shows the structure of the optical system of a conventional head-mounted image display apparatus based on this method.

An image display element 53 is illuminated by a lighting source 52, and the image light based on the image display exits from a projection optical system 54. The image light is reflected at a half mirror 51 and projected onto a reflective screen 56 to form an image. The reflected light from the screen 56 is transmitted by the half mirror 51 and supplied to the user's pupil EP. By this light, the user views the image on the screen 56.

However, in the conventional image display apparatus using a screen, the screen is fixed in front of the user. That is, since the screen is disposed away from the head, the overall mass moment of the apparatus imposed on the user's head is great, so that the load on the user when he or she wears the apparatus on his or her head is heavy.

SUMMARY OF THE INVENTION

An object of the present invention is to reduce the load on the user's head in a head-mounted image display apparatus using a screen.

To achieve the above-mentioned object, a head-mounted image display apparatus according to the present invention is provided with: an image display element; a projection optical system that projects an image displayed by the image display element; a screen onto which the image is projected by the projection optical system; and a combiner disposed between the projection optical system and the screen. The combiner transmits the image light from the projection optical system and directs it to the screen, and reflects the image light reflected at the screen.

In the above-described structure, since the image light from the screen is directed to the user's pupil by being reflected at the combiner, the screen can be disposed close to the user's head. With this disposition, the overall mass moment of the apparatus imposed on the head is reduced.

It is desirable for the combiner to transmit external light and direct it to the user's pupil together with the image light. With this structure, an external image can be viewed together with the displayed image.

It is desirable for the image display apparatus to be put on the head through a head-mounted member, and for the screen to be integrated with the head-mounted member above or below the user's pupil. With this structure, the image display apparatus is easily constructed and the load on the user's head is further reduced.

Moreover, the image display apparatus may have a structure in which an eyepiece optical system is disposed between the combiner and the user's pupil and the user views the image projected onto the screen so as to be enlarged through the eyepiece optical system. In this structure, since the image projected onto the screen is viewed being enlarged, a wide viewing angle can be obtained or the size of the screen can be reduced. Moreover, the user's diopter can be controlled, which enables excellent image viewing.

In the structure in which the eyepiece optical system is disposed, an optical element where the composite optical power of the optical element and the eyepiece optical system is substantially zero may be disposed on the external side of the combiner with respect to the eyepiece optical system. In this case, since the optical power to which the external light is subjected before reaching the user's pupil is substantially zero even though the eyepiece optical system is provided, excellent external image viewing can be performed.

Further, the image display apparatus may have a plurality of units each including the image display element and the projection optical system, so that images corresponding to the user's left and right pupils are formed on the screen. In this structure, by providing parallax between the left and right images, three-dimensional images can be viewed.

It is desirable for the screen used in the above-descried structures to have a retroreflection characteristic. The retroreflection characteristic enables most of the light made incident on the screen to be incident on the user's pupil, so that bright images can be viewed.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the drawings.

First Embodiment

Figure 1:
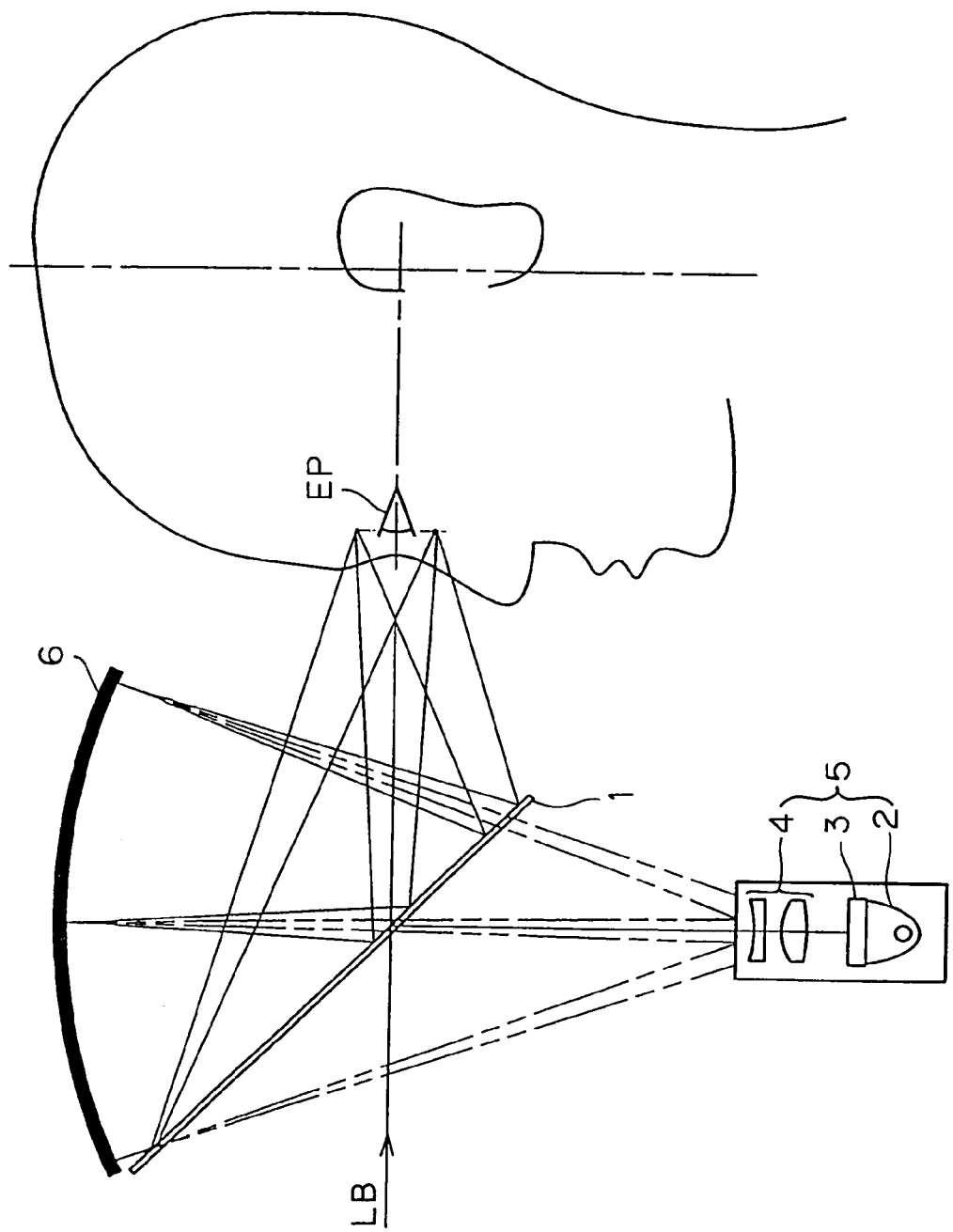
FIG. 1 shows the structure of an optical system of an image display apparatus according to a first embodiment.

FIG. 1 shows the structure of an image display optical system of a head-mounted image display apparatus according to this embodiment. This optical system comprises a half mirror 1 situated in front of the user's pupil, a diffuse-reflective screen 6 disposed above the half mirror 1, and a projection unit 5 including a projection optical system 4, an image display element 3 and a lighting source 2 disposed below the half mirror 1. In this optical system, the distances from the user's pupil and the exit pupil of the projection optical system 4 to the half mirror 1 are substantially the same.

The image display element 3 is illuminated by the lighting source 2, and the image light based on the image display exits from the projection optical system 4. The image light is transmitted by the half mirror 1 and projected onto the reflective screen 6 to form an enlarged image. The reflected light from the screen 6 is reflected at the half mirror 1 and supplied to the user's pupil EP. By this light, the user views the image on the screen 6.

As described above, in this embodiment, the half mirror 1 is used as a combiner, and the half mirror 1 transmits the light from the projection unit 5 and directs it to the screen 6, and reflects the light from the screen 6 and directs it to the user's pupil EP. Moreover, the half mirror 1 transmits external light LB and directs it to the user's pupil EP together with the image light. Consequently, by the light from the half mirror 1, the user can view an external image being superimposed on the image on the screen 6.

A polarization separation surface may be provided instead of the half mirror 1. In this case, by using it in combination with a polarizing plate, the same working as that obtained through the use of the half mirror 1 can be obtained. When a polarization separation surface is used, since total transmission and total reflection can be achieved by making incident the polarized light responsive to the characteristic of the polarization separation surface, the light quantity loss of the image light can be reduced.

Figure 2:
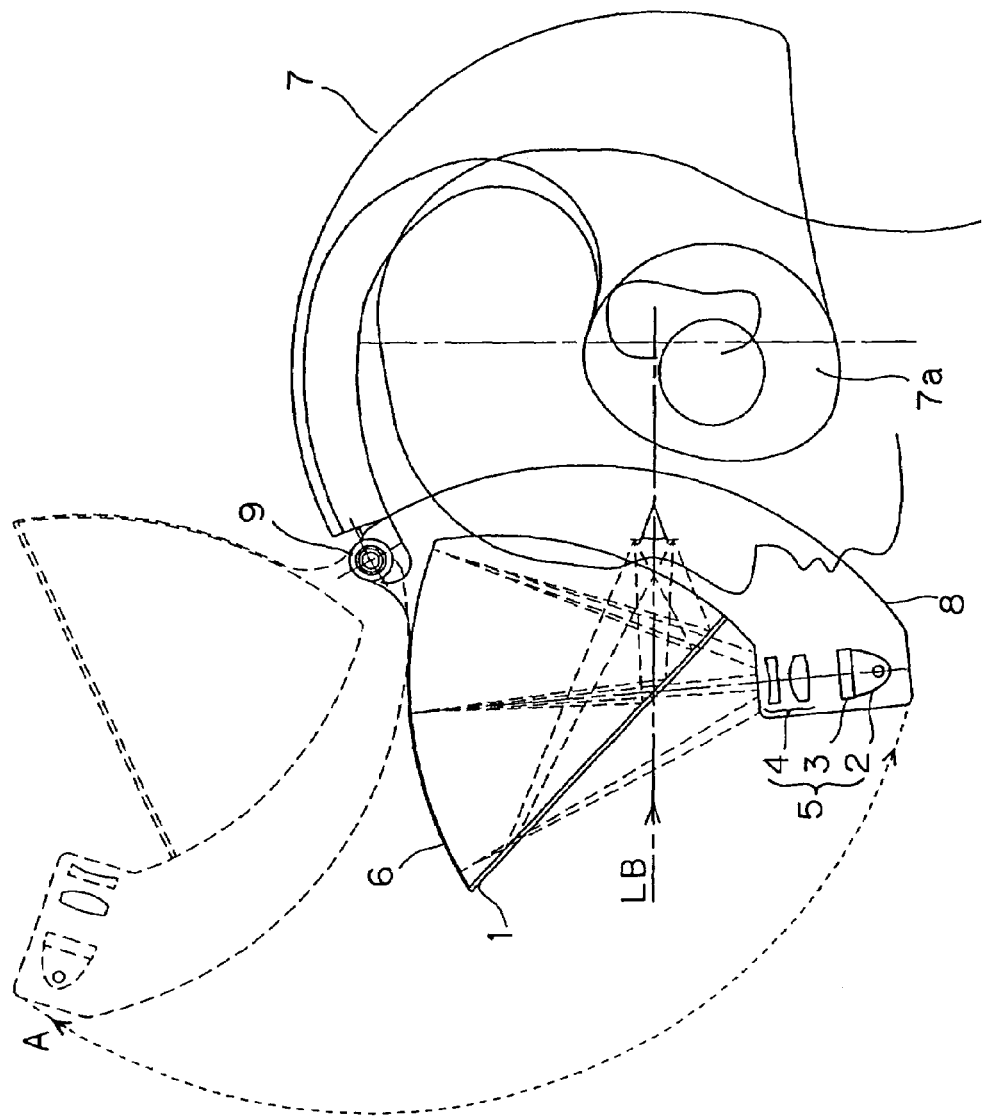
FIG. 2 shows a concrete structure of a head-mounted image display apparatus using the optical system of FIG. 1.

FIG. 2 shows a concrete structure of a head-mounted image display apparatus using the image display optical system. In this apparatus, the image display optical system shown in FIG. 1 is provided in a viewing member 8, and the viewing member 8 is held by a helmet-type head-mounted member 7 through a rotating hinge 9. The viewing member 8 is retractable in the direction of the arrow A from a viewing condition shown by the solid line by the rotating hinge 9, and is in the condition shown by the dotted line when retracted. In the retracted condition, there is nothing to obstruct the user's view.

The head-mounted member 7 has earpieces 7a. The earpieces 7a each include a non-illustrated speaker so that sound based on externally transmitted sound signals is supplied to the user.

In the viewing condition of the viewing member 8, the screen 6 is disposed so as to extend forward from a neighborhood of the user's forehead and the projection unit 5 is disposed in the vicinity of the user's mouth, so that the mass moment imposed on the user's head by the viewing member 8 is small. Consequently, even if the user continues image viewing for a long time, the load on the user is light and the user does not easily get fatigued.

Figure 3:
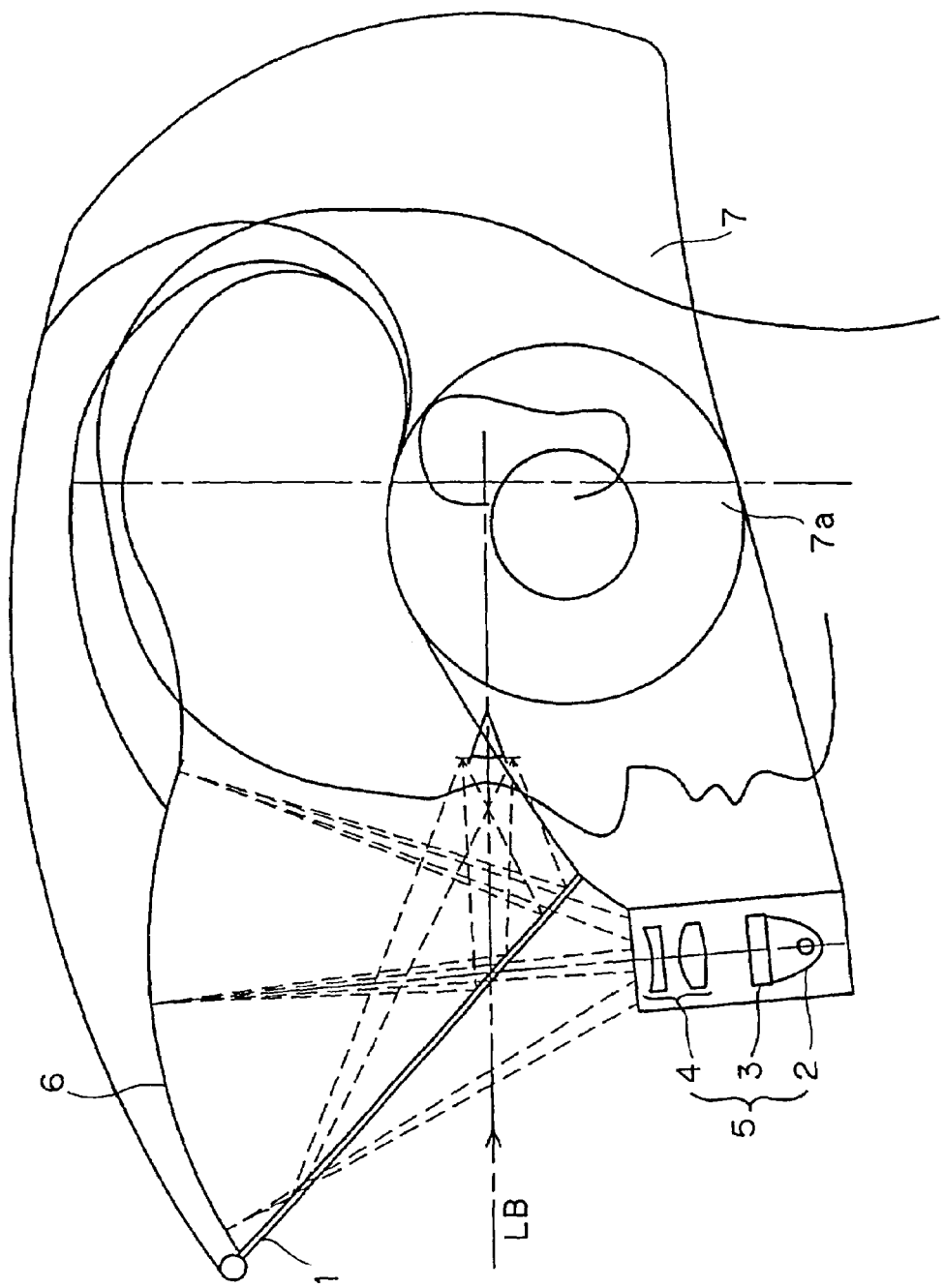
FIG. 3 shows a concrete structure of another head-mounted image display apparatus using the optical system of FIG. 1.

FIG. 3 shows a concrete structure of a head-mounted image display apparatus using the image display optical system which structure is different from that of FIG. 2. In this apparatus, the image display optical system shown in FIG. 1 is integrated with the head-mounted member 7. The head-mounted member 7 has a helmet configuration of which upper and lower parts protrude forward from the side of the user. The visor-like upper protruding part has the screen 6, and the projection unit 5 is provided in the lower protruding part. The head-mounted member 7 has earpieces 7a similar to those of FIG. 2.

In the image display apparatus shown in FIG. 3, because of the integration of the image display optical system and the head-mounted member 7, the mass moment imposed on the user's head is further reduced.

Second Embodiment

Figure 4:
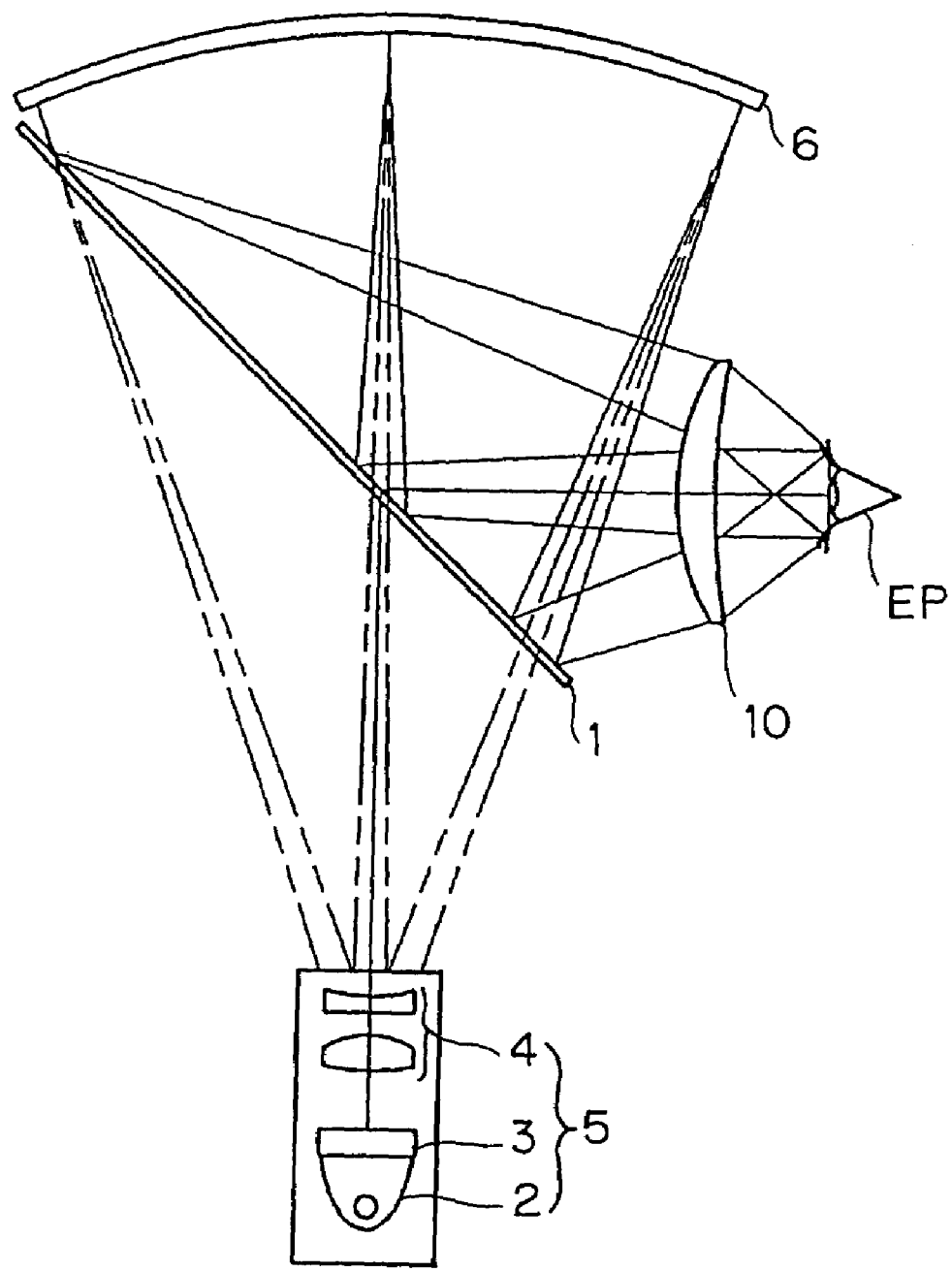
FIG. 4 shows the structure of an optical system of an image display apparatus according to a second embodiment.

FIG. 4 shows the structure of an image display optical system of a head-mounted image display apparatus according to this embodiment. The structure of this optical system is similar to that of the optical system of the first embodiment except that an eyepiece optical system 10 is disposed between the half mirror 1 and the user's pupil EP. By interposing the eyepiece optical system 10, the user can view an enlargement of the image projected onto the screen 6, so that a wide viewing angle is achieved. Moreover, the image viewing distance (diopter) can be adjusted, which enables more natural image viewing.

Third Embodiment

Figure 5:
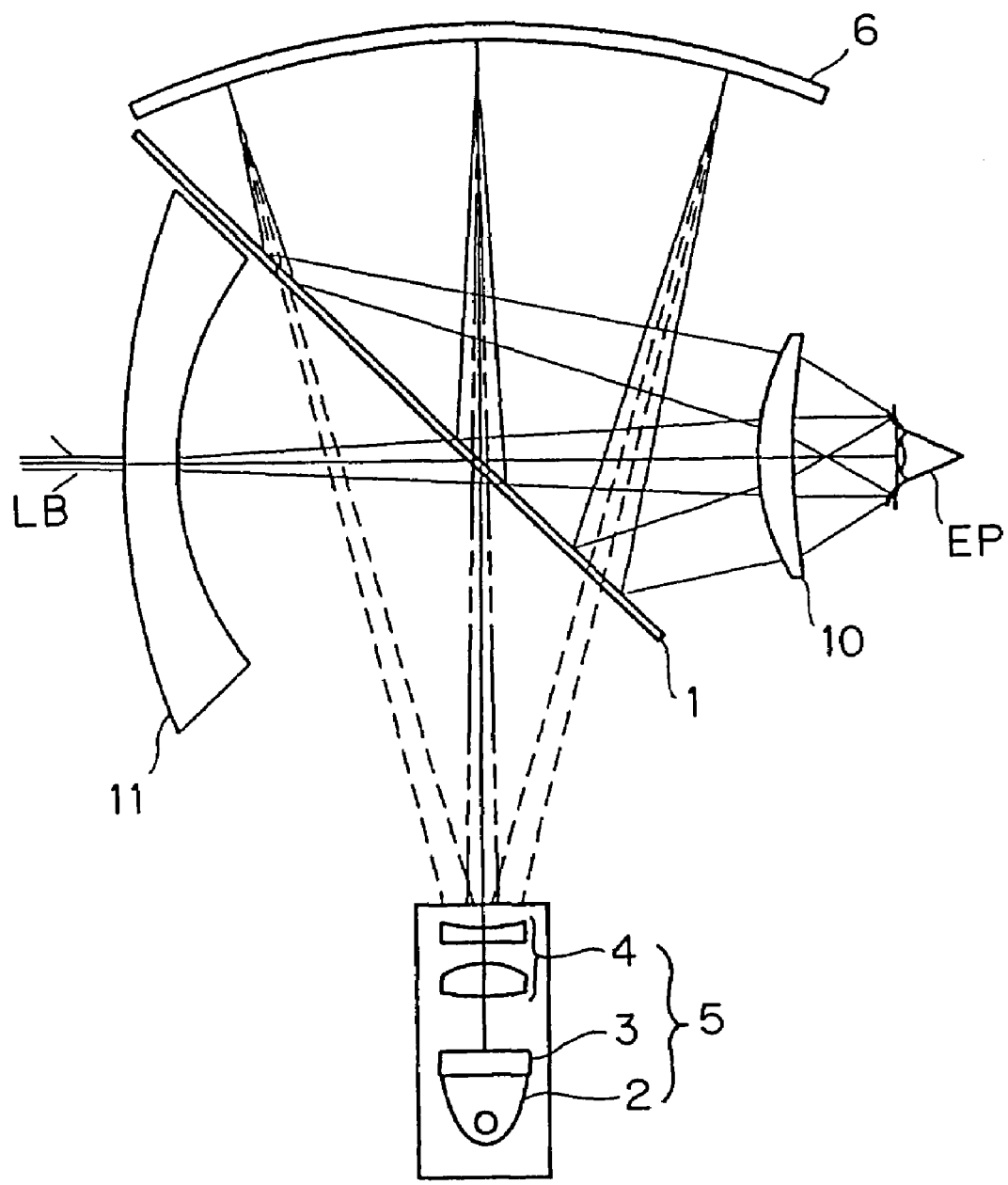
FIG. 5 shows the structure of an optical system of an image display apparatus according to a third embodiment.

FIG. 5 shows the structure of an image display optical system of a head-mounted image display apparatus according to this embodiment. In this optical system, an optical element 11 is further provided in the optical system of the second embodiment. The optical element 11 is disposed on the external side of the half mirror 1 with respect to the eyepiece optical system 10, and has an optical power which is substantially zero when joined with the optical power of the eyepiece optical system 10.

In this optical system, since external images are viewed through the eyepiece optical system 10 and the optical element 11, natural external images can be viewed.

Fourth Embodiment

Figure 6:
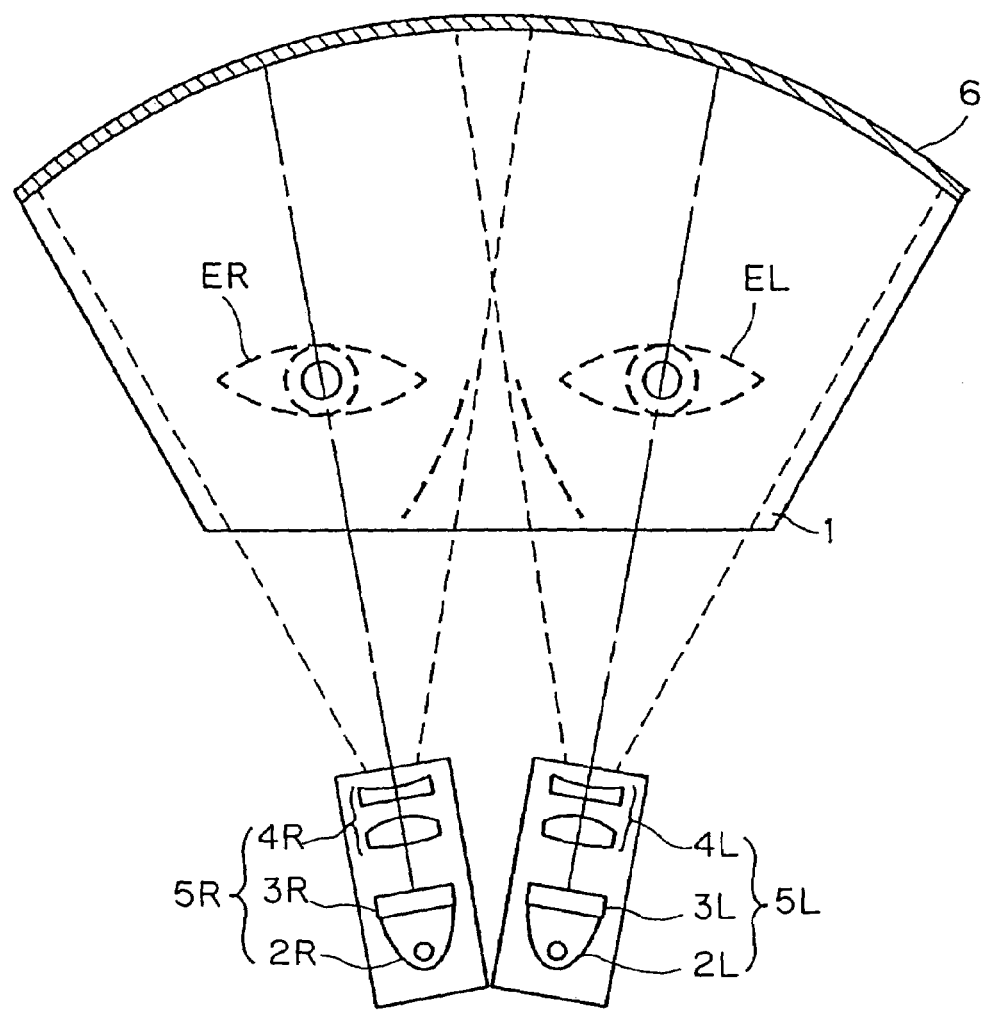
FIG. 6 shows the structure of an optical system of an image display apparatus according to a fourth embodiment.
Figure 7:
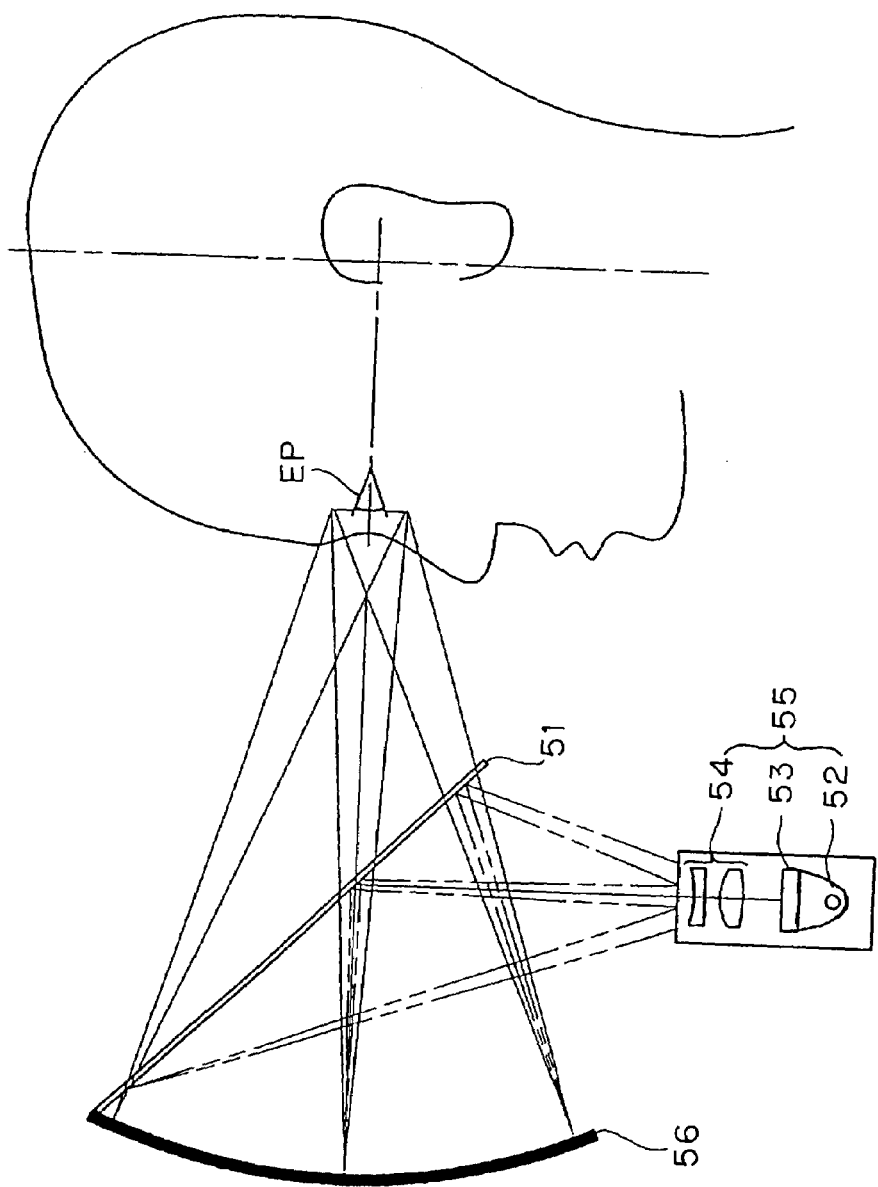
FIG. 7 shows the structure of the optical system of the conventional head-mounted image display apparatus.

FIG. 6 is a front view showing the structure of an image display optical system of a head-mounted image display apparatus according to this embodiment. This embodiment is different from the first embodiment only in that two projection units are provided in correspondence with the left and right eyes. By the projection light exiting from a projection unit 5L for the left eye, an image for the left eye is formed on the screen 6. The user's left eye EL views this image. By the projection light exiting from a projection unit 5R for the right eye, an image for the right eye is formed on the screen 6. The user's right eye ER views this image.

In this structure, three-dimensional images can be displayed by providing parallax between the left and right images.

It is desirable for the screen 6 of the optical systems of the first to the fourth embodiments to have a retroreflection characteristic. According to the retroreflection characteristic, the image light exiting from the exit pupil of the projection optical system can be efficiently made incident on the user's pupil, so that brighter images can be viewed. In the fourth embodiment, by providing the retroreflection characteristic, the left and right luminous fluxes from the screen can be separated. This reduces crosstalk between the left and right images so that more excellent three-dimensional images can be viewed.

While in the above-described embodiments, the projection unit is disposed below the half mirror 1 and the screen is disposed above the half mirror 1, they may be disposed in the opposite positions because similar effects are obtained when they are disposed in the opposite positions.

While the screen is concave to the side of the projection optical system, the configuration of the screen is not limited thereto; for example, the screen may be flat. However, when the screen is concave with the exit pupil of the projection optical system substantially as the center, since diffusibility is uniformly obtained with respect to the direction of incidence, the diffusibility is uniform also on the user's pupil, so that uniform brightness across the angle of view is easily obtained. In the case where the screen has the retroreflection characteristic, since the retroreflection efficiency decreases when the angle of incidence on the screen is large, it is desirable for the angle of incidence not to largely vary according to the angle of view. The concave shape is effective also in this respect.

Obviously, many modifications and variations of the present invention are possible in light of the above teachings. It is therefore to be understood that within the scope of the appended claims, the invention may be practiced other than as specifically described.

What is claimed is:

1. A head-mounted image display apparatus comprising:
    an image display element;
    a projection optical system that projects an image displayed by said image display element;
    a screen on which the image projected by said projection optical system is formed;
    a combiner disposed between said projection optical system and said screen;
    an eyepiece optical system disposed between said combiner and the user, said eyepiece optical system enlarging the image projected onto said screen; and
    an optical element disposed on an external side of said combiner with respect to said eyepiece optical system, a composite optical power of said eyepiece optical system and said optical element being substantially zero,
    wherein said combiner transmits image light from said projection optical system and directs it to said screen, and reflects the image light reflected at the screen while simultaneously transmitting external light.

2. A head-mounted image display apparatus as claimed in claim 1, wherein said screen is disposed above or below a user's pupil.

3. A head-mounted image display apparatus as claimed in claim 1,
    wherein said image display apparatus has a plurality of units each including said image display element and said projection optical system.

4. A head-mounted image display apparatus as claimed in claim 3,
    wherein said units form images corresponding to the user's left and right pupils.

5. A head-mounted image display apparatus as claimed in claim 1,
    wherein said screen has a retroreflection characteristic.

6. A head-mounted image display apparatus as claimed in claim 1,
    wherein said combiner is a half mirror or a polarization separation member.

7. A head-mounted image display apparatus comprising:
    an image display element;
    a projection optical system that projects an image displayed by said image display element;
    a screen on which the image projected by said projection optical system is formed;
    a combiner that reflects image light reflected at said screen, and simultaneously transmits external light;
    an eyepiece optical system disposed between said combiner and a user, said eyepiece optical system enlarging the image projected onto said screen; and
    an optical element disposed on an external side of said combiner with respect to said eyepiece optical system, a composite optical power of said eyepiece optical system and said optical element being substantially zero.

8. A head-mounted image display apparatus as claimed in claim 7,
    wherein said combiner further transmits image light from said projection optical system and directs it to said screen.

9. A head-piece adapted to be worn on a head of a wearer, the head of the wearer having a face, the head-piece comprising:
    a hood, said hood adapted to be positioned on the head of the wearer;
    a visor having a first end and a second end, said first end of said visor rotatably mounted to said hood such that said visor rotates from a first position, substantially covering the face of the wearer, to a second position not substantially covering the face of the wearer;
    an image display apparatus comprising:
        an image display element;
        a projection optical system that projects an image displayed by said image display element;
        a screen on which the image projected by said projection optical system is formed;
        a combiner that reflects image light reflected at said screen, and transmits external light;
        an eyepiece optical system disposed between said combiner and the wearer,
            wherein said eyepiece optical system enlarges the image projected onto said screen; and
        an optical element disposed on an external side of said combiner with respect to said eyepiece optical system,
            wherein a composite optical power of said eyepiece optical system and said optical element is substantially zero, and
            wherein said image display apparatus is positioned substantially at said second end of said visor.

* * * * *